(12) United States Patent
Koeberle et al.

(10) Patent No.: US 7,286,220 B2
(45) Date of Patent: Oct. 23, 2007

(54) TEST PIECE FOR OPTOELECTRONIC IMAGE ANALYSIS SYSTEMS

(75) Inventors: Konrad Koeberle, Backnang (DE); Guenter Hausenbiegl, Weinstadt (DE); Harald Proell, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 10/158,092

(22) Filed: May 30, 2002

(65) Prior Publication Data

US 2002/0198673 A1  Dec. 26, 2002

(30) Foreign Application Priority Data

May 30, 2001  (DE) ................. 101 26 185

(51) Int. Cl.
  *G01J 1/10*   (2006.01)
  *G01N 21/00*  (2006.01)
  *G03F 9/00*   (2006.01)

(52) U.S. Cl. .................. 356/243.6; 430/5; 430/22; 250/491.1; 356/239.8

(58) Field of Classification Search .. 356/238.1–238.3, 356/239.1, 239.2, 239.3, 237.4, 237.5, 237.6, 356/243.1–243.6; 430/22, 296, 311, 5, 29, 430/394, 30
See application file for complete search history.

(56) References Cited

U.S. PATENT DOCUMENTS

| | | | |
|---|---|---|---|
| 3,907,303 A * | 9/1975 | Locker | 273/157 R |
| 4,591,540 A * | 5/1986 | Bohlen et al. | 430/22 |
| 4,735,881 A * | 4/1988 | Kobayashi et al. | 430/30 |
| 4,982,214 A * | 1/1991 | Matsui | 396/150 |
| 5,012,523 A * | 4/1991 | Kobayashi et al. | 382/145 |
| 5,308,741 A * | 5/1994 | Kemp | 430/312 |
| 5,364,718 A * | 11/1994 | Oae et al. | 430/5 |
| 6,124,598 A * | 9/2000 | Takizawa | 250/491.1 |
| 6,335,129 B1 * | 1/2002 | Asano et al. | 430/5 |
| 6,528,334 B1 * | 3/2003 | Mizuo et al. | 438/16 |
| 6,628,379 B1 * | 9/2003 | Sudo et al. | 356/237.1 |
| 6,668,078 B1 * | 12/2003 | Bolle et al. | 382/164 |
| 6,912,048 B2 * | 6/2005 | Pirani et al. | 356/238.3 |

FOREIGN PATENT DOCUMENTS

| | | |
|---|---|---|
| DE | 27 12 590 | 10/1977 |
| DE | 35 07 778 | 9/1985 |
| DE | 196 49 925 | 6/1998 |
| EP | 1 063 569 | 12/2000 |

* cited by examiner

Primary Examiner—Sang H. Nguyen
(74) Attorney, Agent, or Firm—Kenyon & Kenyon LLP

(57) ABSTRACT

A test piece for an optoelectronic image analysis systems is disclosed. One embodiment has a planar substrate, on which a plurality of geometrical patterns of differing shapes and/or sizes are arranged in a durable, predetermined surface coverage. The geometrical patterns contrast optically against the substrate. The surface coverage of geometrical patterns on the substrate is provided such that an overlapping of the geometrical patterns is avoided. In addition, a method of fabrication of a test piece is provided, in which a metal film is deposited on a glass/ceramic substrate, subsequently the metal film is exposed according to a predetermined pattern, and finally the film is etched to create the geometrical pattern on the glass/ceramic substrate.

28 Claims, 3 Drawing Sheets

TEST PIECE FOR OPTOELECTRONIC IMAGE ANALYSIS SYSTEMS

FIELD OF THE INVENTION

The present invention relates to a test piece for optoelectronic image analysis systems, the test piece having a planar substrate, on which a plurality of geometrical patterns is arranged, as well as a method for manufacturing a test piece.

BACKGROUND OF THE INVENTION

After the manufacture of products, i.e., components, it is usually necessary before using them to clean them of dirt particles using an appropriate cleaning process. In the context of quality control, the performance of the available cleaning processes is usually checked using light-microscopy systems.

For this purpose, a product, i.e., a component, which was cleaned in accordance with the available cleaning process, is once again thoroughly cleaned, the dirt particles that are removed in the process remaining, for example, in a cleaning fluid, which is passed through a filter. In this context, the dirt particles remain on the filter, which is placed under a light-optical microscope of the light-microscopy system. Using the light-microscopy system, the loaded filter is analyzed, the light-optical microscope being connected to an image analysis system, i.e., evaluation system. In the evaluation, bright and dark spots are distinguished and their size and number is determined. Then a classification takes place of the dark spots, which represent the dirt particles.

However, in this context, it is disadvantageous that the received evaluation protocols of the image analysis systems that are known from practice currently cannot be verified, because the precise actual accumulation on the filter, i.e., the number of dirt particles of different particle size categories, is not known and is difficult to determine using manual evaluation. Therefore, it is impossible to determine the deviation between the evaluation protocol and the actual accumulation.

From practice, test pieces, i.e., so-called standards, are known, which are covered by a single geometrical pattern. This single pattern, whose dimensions are known, is measured and classified in one single measuring step using an optoelectronic image analysis system.

However, using test pieces of this type, only individual measurements can be carried out, which is a disadvantage, whereas using an image analysis system a totality of actual filters that are loaded with dirt particles can be evaluated such that a classification of the dirt particles is produced with respect to size and number, on the basis of which it is possible to carry out an evaluation of a cleaning process that has been applied.

Filters having dirt particles are evaluated using known optoelectronic image analysis systems, such that the loaded filter surface is divided into different measuring fields, i.e., test surfaces, which are scanned by the image analysis system sequentially. After termination of the automatic test run, the different individual measurements are combined, and an evaluation for the entire filter surface is created. Using the test pieces that are known from practice, this kind of automatic measuring run of an optoelectronic image analysis system cannot be simulated, because the test pieces are covered by only a single geometrical pattern, or they have geometrical patterns that are nested in each other and that cannot be resolved by the image analysis systems.

In an automatic measuring run, the filter element may be typically divided into a plurality of measuring fields, which are scanned, measured, and then analyzed in sequence by an optoelectronic image analysis system. One particularly problematic case occurs when a particle is bisected, i.e., partially located in one measuring field and partially in one or more other measuring fields. Then, the automatic measuring run should resolve the particle as one single particle and assign it to only one measuring field. Otherwise, errors in the analysis can occur either over-counting or under-counting the particle. This is undesirable, because the evaluation of the number and size of particles is used to determine the quality of the cleaning process and, in response to the erroneous detection of a high level of impurities of particles of a specific size category, the evaluation can lead to inappropriate measures being taken for improving the cleaning process.

Another method of preparing a test piece for evaluation of an image analysis system is to arrange actual dirt particles on a substrate and to localize them in an embedding mass that constitutes a solid connection to the substrate. However, in this context, it is disadvantageous that the known embedding masses are not durable and that the arrangement of the particles does not stay unchanged, so that test pieces of this type become unusable as their service life proceeds. A further disadvantage lies in the fact that the dimensions of the dirt particles used have to be determined manually in order to be able to analyze the evaluation of an optoelectronic image analysis system, standards of this type representing unique specimens, which can only be reproduced with great difficulty, if at all.

SUMMARY OF THE INVENTION

In an embodiment of the invention, a test piece for optoelectronic image analysis systems has a planar substrate 2, on which a plurality of geometrical patterns 3 of different shapes and/or sizes are fixedly arranged in a durable surface coverage that can be specified, the patterns 3 contrasting, or standing out, optically from the substrate 2. In a particular embodiment, the surface coverage of the substrate 2 is prescribed by geometrical patterns such that an overlapping of the geometrical patterns 3 is avoided. Using the test piece according to one embodiment of the method of the present invention, an automatic measuring sequence is simulated and its results verified precisely based on a comparison to the known surface coverage of the test piece.

In an embodiment of the invention, the verification of results is achieved as a result of the fact that on a planar substrate of the test piece a plurality of geometrical patterns of different size is arranged in a prescribed, i.e., known, surface coverage, the patterns contrasting optically from the substrate, and the surface coverage of the substrate being provided with the geometrical patterns such that an overlapping of the patterns is avoided. In this way, on the one hand, the actual surface coverage or accumulation on a filter can be sufficiently precisely simulated, and on the other hand, geometrical patterns are made available which can be resolved by an image analysis system.

In an automatic measuring run, the surface of the test piece, according to one embodiment of the present invention, is divided into a plurality of measuring fields, which are scanned, measured, and then analyzed in sequence by an optoelectronic image analysis system. In so doing, the problematic case of a bisected geometrical pattern, representing a particle in more than one measuring field, is evaluated. By comparing the evaluation of the automated measuring run to the prescribed surface coverage of geometrical patterns, this embodiment precisely determines to what extent the evaluation of the automatic measuring run resolved the prescribed geometrical patterns. Specifically, the evaluation determines whether the image analysis system, as a result of the subdivision into a plurality of measuring fields, resolves the bisected geometrical patterns as single geometrical patterns assigned to only one measuring field or as a plurality of geometrical patterns assigned to multiple measuring fields or whether no geometrical pattern is resolved by the image analysis system. Using the test piece according to this embodiment, it is advantageously possible to determine the performance of an optoelectronic image analysis system on the basis of a deviation of an evaluation of the test piece using an optoelectronic image analysis system from the actual surface coverage of the test price, which heretofore has been virtually impossible.

In one embodiment of a method according to the present invention, a test piece 1 is manufactured having a substrate 2 and a plurality of geometrical patterns 3 that are arranged on the substrate by applying to the substrate 2 a thin opaque layer 2' and subsequently forming durable geometrical patterns with a prescribed surface coverage that optically contrasts to the substrate. Therefore, reproducible test pieces can be produced having any prescribed geometrical patterns and surface coverage. In particular, using the method according to the present invention, durable test pieces having great precision can be manufactured, which can be reproduced as often as required at the same quality. Therefore, it is advantageously possible over time to carry out in a realistic manner a standardized adjustment of optoelectronic image analysis systems that are used for particle analysis.

The approximation to reality is especially produced by the fact that the specified surface coverage of the test piece having the geometrical patterns and the shape of the patterns of the surface coverage are simulated by actual filters and by the shape of actual dirt particles.

DETAILED DESCRIPTION OF THE INVENTION

Figure 1:
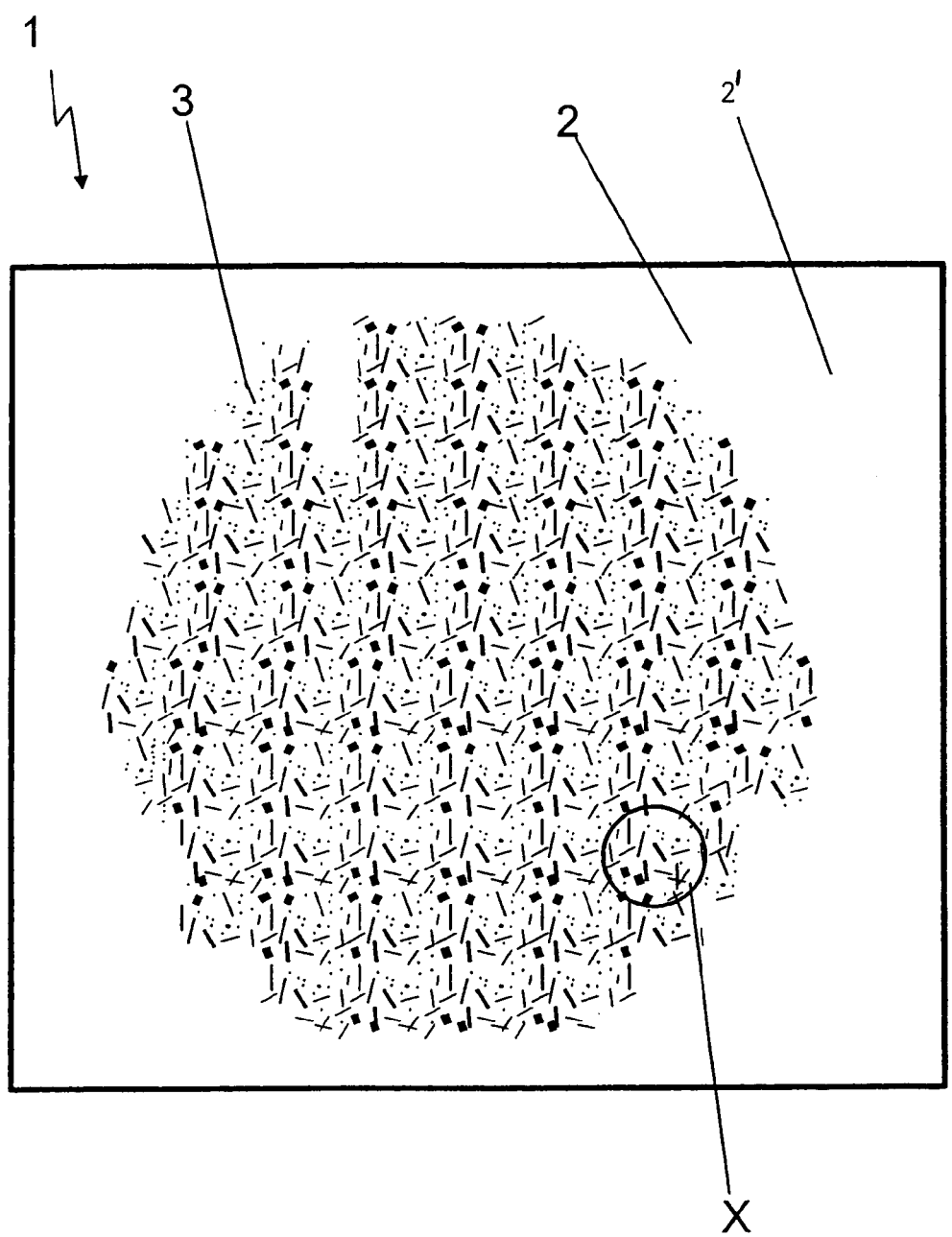
FIG. 1 depicts one embodiment of a test piece according to the present invention, which is provided with a plurality of geometrical patterns of a preestablished surface coverage.

FIG. 1 depicts one embodiment of a test piece 1 for optoelectronic image analysis systems. The test piece has a planar substrate 2, on which a plurality of geometrical patterns 3 of varying shapes and sizes are fixedly arranged in a durable predetermined surface coverage. Geometrical patterns 3 contrast optically from the substrate 2, the surface coverage of the substrate 2 being provided with the geometrical patterns such that an overlapping of geometrical patterns 3 is avoided.

The substrate 2 in one embodiment is composed of a transparent glass ceramic plate, which has a thickness of roughly 2.4 mm, on which the geometrical patterns 3 in a predetermined surface coverage are fixedly arranged. For the surface coverage of the substrate 2, or of the measuring surface of substrate 2, different degrees of freedom are provided, such as geometrical pattern shape, size, orientation, and location.

The surface coverage of substrate 2 is structured especially as a function of the shape of the geometrical patterns 3. For rectangular particles, the shape of geometrical patterns 3 is to be understood as the height-width ratio and the overall dimensions, with the diagonals of a geometrical pattern 3 configured as a rectangle being of particular interest in the evaluation of the surface coverage of the test piece 1 using an image analysis system.

Alternatively, the geometrical patterns can be configured as other two-dimensional geometric shapes, such as triangles, circles, ellipses, or the like. One consideration in configuring geometrical patterns 3 is that the outline of each individual geometrical pattern 3, should be done in a sharp and clear for best measuring results.

Figure 2:
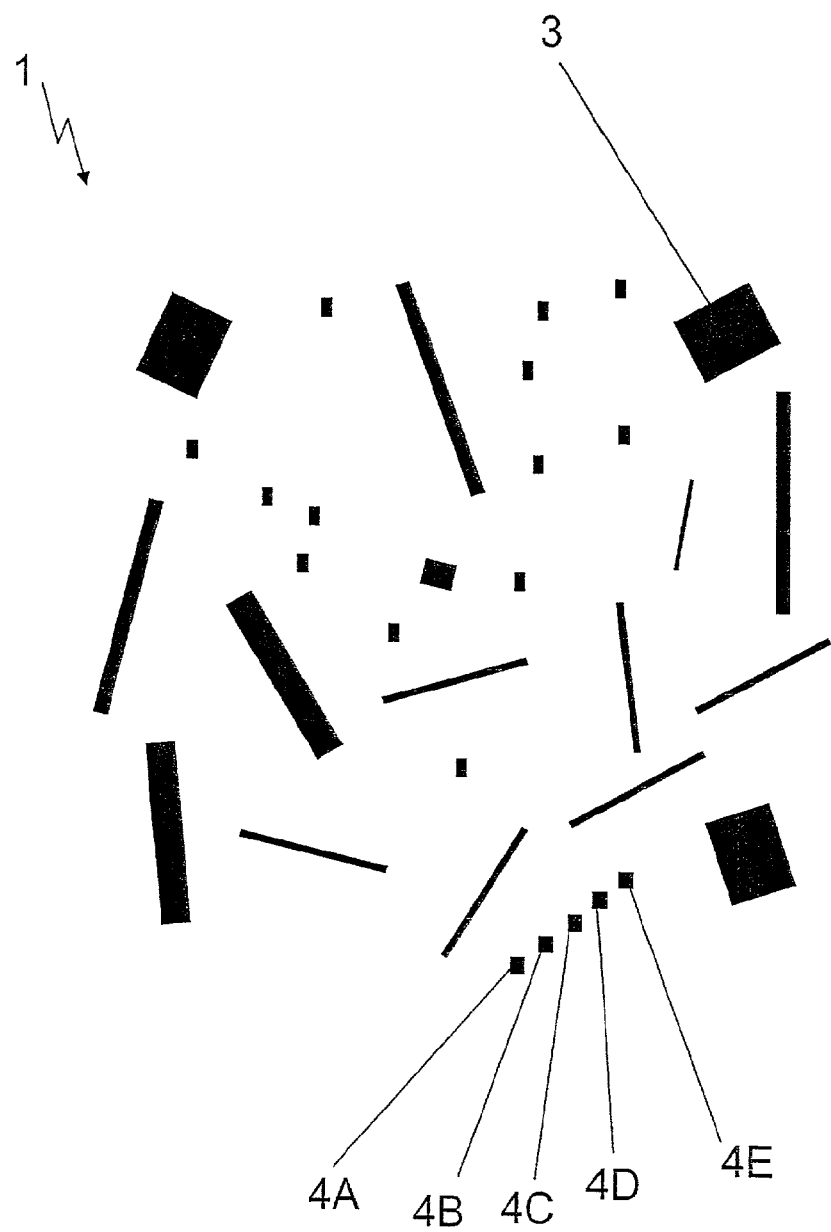
FIG. 2 depicts an enlarged representation of the arrangement of the geometrical patterns according to segment X from FIG. 1.

FIG. 2 illustrates an enlargement of segment X as shown in FIG. 1. The different sizes, shapes, and orientations of each individual geometrical pattern 3 is easier to see. In this embodiment, geometrical patterns 3 are configured as rectangles having varying height-width ratios and a length as measured across the diagonal of the rectangle from about 20 μm to 700 μm.

In addition, this embodiment shows that the geometrical patterns 3 have a predetermined orientation on the substrate 2, and are not arranged with an identical orientation. Instead, each geometrical pattern 3 has a predetermined orientation specified. This is justified by the fact that the dust particles arranged on the actual filters also have different orientations, and the test piece 1 is more representative of a real filter element. Therefore, the effectiveness, i.e., the performance, of the optoelectronic image analysis systems on a real filter element can be more readily checked using the test piece.

A further degree of freedom in the surface coverage of substrate 2 is represented by the stipulation of an absolute position of each individual geometrical pattern 3 on the substrate 2. The absolute coordinates of a geometrical pattern 3 on substrate 2 are of special interest when the test piece 1, i.e., the measuring surface of substrate 2, is subdivided into a plurality of measuring fields, also referred to as test fields. Then, a plurality of geometrical patterns 3 is arranged on the boundary between two, three, or four measuring fields. As mentioned previously, it is preferred that a particular geometric pattern is assigned to one, and only one measuring field and not in the other measuring fields. If, after detecting geometrical patterns 3, the image analysis system, in its evaluation, yields a number that diverges from the actual number of geometrical patterns, then the error may be caused by the fact that the image analysis system detected and assigned a plurality of geometrical patterns 3 to more than one measuring field or assigned the geometrical pattern 3 to none of the measuring fields at all.

Furthermore, the surface coverage of substrate 2 is prescribed by a specific number of geometrical patterns 3 of a specific size category as well as by the distance between and among the adjacent geometrical patterns 3. The geometrical patterns 3 are preferably placed so as to be very close to each other, in order to be able to check how the image analysis system is resolving them. In this embodiment of the invention, it is of particular interest whether the image analysis system resolves one single geometrical pattern from the many small geometrical patterns, or whether it detects each geometrical pattern individually and classifies them individually.

In this connection, reference is made to the embodiment illustrated in FIG. 2, in which a plurality of geometrical patterns 4A through 4E are laid out in step fashion with respect to each other. In this particular embodiment, the distance between geometrical patterns 4A through 4E is about as large as the size of geometrical patterns 4A through 4E themselves. Arrangements of geometrical patterns such as 4A through 4E are known to result in erroneous resolution of a single particle by some image analysis systems.

Using the test piece 1 of this embodiment, varying aspect ratios can also be resolved that come very close to reality. Thus the large quadratic geometrical patterns are representative of shavings, whereas the elongated needle-shaped geometrical patterns are representative of needle-shaped fibers, or particles.

The degree of freedom predetermined for the surface coverage of the test piece 1, or of the substrate 2, is selected according to the specific existing application, and the test piece 1 is manufactured in accordance with the predetermined values, as result of which a test piece once it has been formed, can generally be reproduced as many times as required with great precision.

Figure 3:
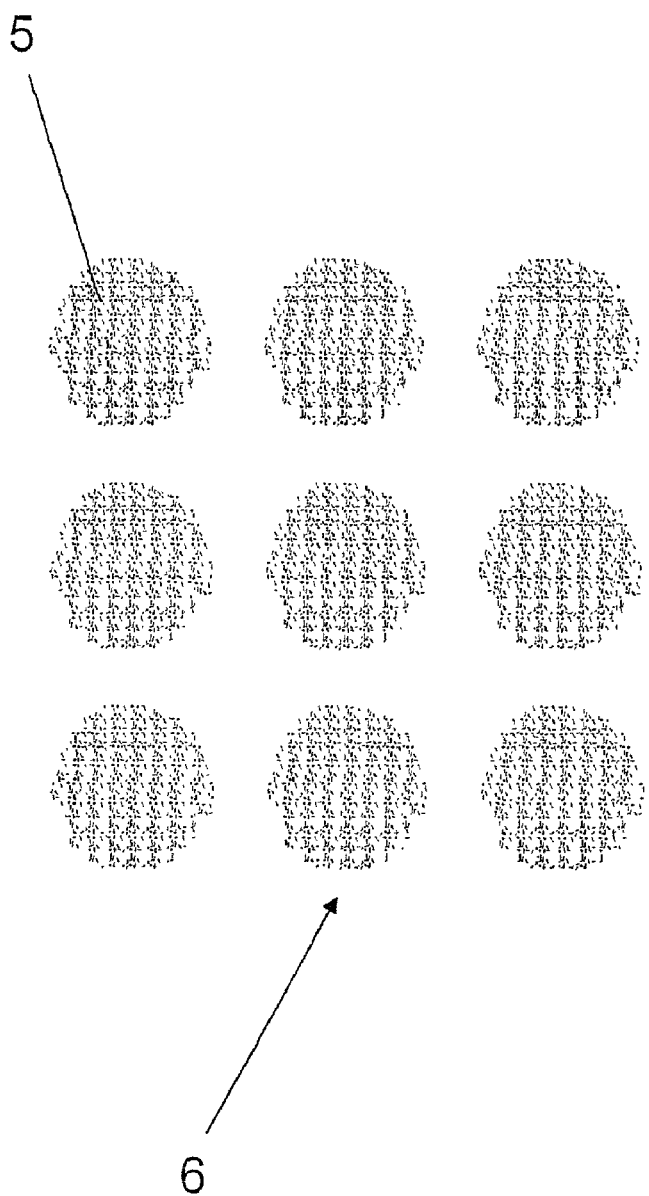
FIG. 3 depicts another embodiment of a test piece according to the present invention having a plurality of circular areas in a matrix.

The manufacture of a specific test piece 1 is carried out essentially in two steps. First, a model test piece, preferably a CAD drawing, is generated for the surface coverage of the substrate 2 having geometrical patterns 3. In this context, in a first step, a plurality of different surface elements is created, each having roughly 20 to 30 geometrical patterns 3 of varying shapes and orientations. The surface element in one exemplary embodiment has a size of 1 mm×1 mm. Alternatively, other sizes can be stipulated, as well as the number of structures diverging therefrom. Then, in one embodiment, a plurality of these different surface elements is statistically arranged, for example within a circular area 5, which is illustrated in FIG. 3. The division of the circular area 5 into different surface elements aids in simplification and provides greater clarity.

As an alternative thereto, it can be provided that entire surface 5 is furnished with patterns all at once, the size and shape of the covered surface being freely a matter of choice, and instead of the circular shape, a square or rectangular shape can also be provided.

A preestablished number of circular shapes 5 is positioned in a matrix 6 so as to have a defined distance to each other, which is measured from the middle point of each circular area to the middle point of the adjacent circular area.

In one specific embodiment, the model test piece is converted into raster data, and a transparent glass or ceramic substrate 2 has a coating vapor deposited on the surface. Then, the coating is exposed to light and etched, such that individual geometrical patterns 3 of circular areas 5 remain on the substrate 2, whereas the metal layer in the other areas of substrate 2 is removed by the etching process. In this context, matrix 6 forms a template, or model, for the simultaneous manufacture of the geometrical patterns 3 on a plurality of substrates 2.

The glass/ceramic plate having geometrical patterns 3 that are each arranged in circular areas 5 are separated from each other, such that in one manufacturing process a plurality of test pieces 1 is produced. The latter are then embedded in metal carriers, which can be precisely positioned in microscopes of the optoelectronic image analysis system. The vapor-deposited metal coating, in one specific embodiment, is a chromium layer; however alternative embodiments, for example using other suitable metals, metal alloys, or suitable nonmetallic materials for the coating of substrate 2, are possible as is known in the art, and are considered within the scope of the present invention.

Using this specific embodiment of a method of manufacturing a test piece, test pieces can be reproduced with a very high degree of precision, because in the manufacture of geometrical patterns 3 a very high degree of precision is achieved with respect to the dimensions, the degree of precision being about 0.1 μm in one embodiment of the method.

The test piece 1 can be used for testing optoelectronic image analysis systems of the most varied types. Test pieces 1 are suited for optoelectronic image analysis systems that are configured using an illumination system or using a transmitted-light system.

Furthermore, using proposed test pieces 1, it is possible to simulate virtually all arrangements and shapes of dirt particles that arise in reality, because geometrical patterns 3 can be executed without difficulty as combinations of the greatest variety of geometrical shapes, such as circles, triangles, rectangles, as well as any and all other suitable geometrical shapes.

The simulation of a real surface accumulation of particles on a filter surface by the embodiments of the invention is distinguished by the fact that in many areas, especially in the selection of the size, number, orientation of the individual geometrical patterns and the size and shape of the surface coverage of the substrate, the test piece has an enormous variability. As a result of the fact that the manufacture of the test piece 1 is carried out by the computer-supported production of the model and in the subsequent exposure to light and the etching of the precoated glass plate, any adjustments to an actual surface accumulation, such as changes of the size range of the particles, can be accommodated by alteration of the test piece.

Using an embodiment employing a CAD drawing as a point of departure, identical test pieces can be manufactured having identical precision at any time, and due to the CAD drawing model test piece, the surface coverage parameters of the test piece, i.e., the size, position, and orientation of each individual pattern, is predetermined. Therefore, the image-analytical evaluation can be evaluated with respect to the precision of the measurement and the complete detection of patterns, especially in the case of automatic measurements over a larger sequence of images.

What is claimed is:

1. An optoelectronic image analysis system, comprising:
 a test piece including a planar substrate and a plurality of geometrical patterns fixedly arranged in a durable surface coverage on the planar substrate;
 a device configured to evaluate at least one of a number and size of the particles on the test piece;
 wherein the geometrical patterns have at least one of multiple shapes and sizes, and wherein the geometrical patterns contrast optically from the planar substrate and are optically non-transparent compared to the planar substrate, and wherein the geometrical patterns do not overlap and do not touch.

2. The optoelectronic image analysis system as recited in claim 1, wherein a configuration of the durable surface coverage of the substrate is provided as a function of shapes of the plurality of geometrical patterns.

3. The optoelectronic image analysis system as recited in claim 2, wherein each of the plurality of geometrical patterns are rectangular.

4. The optoelectronic image analysis system as recited in claim 3, wherein at least some of the plurality of geometrical patterns are about the same size and are arranged in step fashion with respect to each other, and wherein the at least some of the plurality of geometrical patterns are spaced apart about the same distance as the size of the at least some of the plurality of geometrical patterns.

5. The optoelectronic image analysis system as recited in claim 1, wherein a configuration of the durable surface coverage of the substrate is provided as a function of positions of the plurality of geometrical patterns.

6. The optoelectronic image analysis system as recited in claim 1, wherein a configuration of the durable surface coverage of the substrate is provided as a function of an orientation of the plurality of geometrical patterns.

7. The optoelectronic image analysis system as recited in claim 1, wherein a configuration of the durable surface coverage of the substrate is provided as a function of a number of geometrical patterns of a specific size range.

8. The optoelectronic image analysis system as recited in claim 1, wherein a configuration of the durable surface coverage of the substrate is provided as a function of a distance between two adjacent geometrical patterns of the plurality of geometrical patterns.

9. The optoelectronic image analysis system as recited in claim 1, wherein the plurality of geometrical patterns are formed by a metal coating.

10. The optoelectronic image analysis system as recited in claim 9, wherein the metal coating includes at least chrome.

11. The optoelectronic image analysis system as recited in claim 1, wherein the substrate is a transparent plate made of at least one of glass and ceramic.

12. The optoelectronic image analysis system as recited in claim 1, wherein the substrate is embedded in a metal carrier.

13. The optoelectronic image analysis system as recited in claim 1, wherein the device is adapted to subdivide the test piece into a plurality of measuring fields.

14. The optoelectronic image analysis system as recited in claim 13, wherein the device is adapted to at least one of scan, measure, and analyze the geometrical patterns in each of the plurality of measuring fields.

15. The optoelectronic image analysis system as recited in claim 1, wherein the device is adapted to gauge the performance of the optoelectronic image analysis system.

16. The optoelectronic image analysis system as recited in claim 13, wherein the device is adapted to determine whether at least one of (a) the optoelectronic image analysis system resolves a bisected geometrical pattern one of (i) as a single geometric pattern assigned to only one of the measuring fields, and (ii) as a plurality of geometrical patterns assigned to multiple of the measuring fields, and (b) whether no geometrical pattern is resolved by the optoelectronic image analysis system.

17. A method for analyzing particles using an optoelectronic image analysis system comprising:
applying the particles to a test piece including a planar substrate and a plurality of geometrical patterns fixedly arranged in a durable surface coverage on the planar substrate, wherein the geometrical patterns have at least one of multiple shapes and sizes, and wherein the geometrical patterns contrast optically from the planar substrate and are optically non-transparent compared to the planar substrate, and wherein the geometrical patterns do not overlap and do not touch;
exposing the test piece with the particles to an optoelectronic image analysis system;
evaluating at least one of a number and size of the particles on the test piece.

18. The method as recited in claim 17, wherein the test piece is manufactured by first applying a thin opaque layer to a substrate and then subsequently forming the geometrical patterns on the test piece.

19. The method as recited in claim 18, wherein the step of applying a thin opaque layer comprises vapor-depositing a metal layer.

20. The method as recited in claim 18, wherein the step of forming the geometrical patterns comprises processing the thin opaque layer such that the thin opaque layer is partially removed, and wherein the remaining thin opaque layer corresponds to areas where the durable geometrical patterns are provided.

21. The method as recited in one of claim 18, wherein the geometrical patterns are selected having a variation in at least one degree of freedom selected from the group of degrees of freedom consisting of size, shape, orientation and location.

22. The method as recited in claim 21, wherein the step of forming the geometrical patterns comprises arranging a plurality of surface elements within at least one circular area on the substrate.

23. The method as recited in claim 22, wherein a plurality of circular areas are arranged in a matrix at a defined distance from one another on the surface of the substrate.

24. The method as recited in claim 23, wherein the matrix is used as a template for forming the geometrical patterns on the substrate.

25. The method as recited in claim 17, further comprising the step of subdividing the test piece into a plurality of measuring fields.

26. The optoelectronic image analysis system as recited in claim 25, further comprising the step of determining whether at least one of (a) the optoelectronic image analysis system resolves a bisected geometrical pattern one of (i) as a single geometric pattern assigned to only one of the measuring fields, and (ii) as a plurality of geometrical patterns assigned to multiple of the measuring fields, and (b) no geometrical pattern is resolved by the optoelectronic image analysis system.

27. The method as recited in claim 17, further comprising at least one of scanning, measuring, and analyzing the geometrical patterns in each of the plurality of measuring fields.

28. The method as recited in claim 17, further comprising the step of gauging the performance of the optoelectronic image analysis system.

* * * * *